United States Patent
Powell

(10) Patent No.: US 6,854,611 B2
(45) Date of Patent: Feb. 15, 2005

(54) LOCK FOR PREVENTING INADVERTENT REMOVAL OF A FIRST FRAME COMPONENT OF AN ADJUSTABLE STORAGE SYSTEM FROM A SECOND FRAME COMPONENT OF THE ADJUSTABLE STORAGE SYSTEM AND THE ADJUSTABLE STORAGE SYSTEM

(75) Inventor: Michael Powell, East Stroudsburg, PA (US)

(73) Assignee: Excel Storage Products, Inc., Bowerston, OH (US)

( * ) Notice: Subject to any disclaimer, the term of this patent is extended or adjusted under 35 U.S.C. 154(b) by 0 days.

(21) Appl. No.: 10/385,277

(22) Filed: Jul. 11, 2003

(65) Prior Publication Data

US 2004/0084394 A1 May 6, 2004

(51) Int. Cl.[7] .............................. A47B 43/00; F16B 9/00
(52) U.S. Cl. .................. 211/192; 248/221.11; 403/321; 403/327
(58) Field of Search ................................ 211/191, 192; 292/60, 175; 70/81, DIG. 19, DIG. 20; 403/255, 247, 254, 324, 321, 326, 327; 248/219.1, 221.12, 221.11, 220.22

(56) References Cited

U.S. PATENT DOCUMENTS

| 2,422,693 | A | * | 6/1947 | McArthur | 410/116 |
| 3,468,169 | A | * | 9/1969 | Welch | 74/2 |
| 4,074,812 | A | * | 2/1978 | Skubic et al. | 211/192 |
| 6,155,441 | A | * | 12/2000 | Andersen et al. | 211/192 |
| 6,595,379 | B1 | * | 7/2003 | Powell | 211/192 |
| 2002/0153341 | A1 | * | 10/2002 | May et al. | 211/192 |

* cited by examiner

Primary Examiner—Peter M. Cuomo
Assistant Examiner—Erica B. Harris
(74) Attorney, Agent, or Firm—Reed Smith LLP

(57) ABSTRACT

A lock for preventing inadvertent removal of a first frame component from a second frame component of an adjustable storage system. The lock includes a housing having a distal end extending into the first frame component, a shaft having a proximal end and a distal end and being movable between an extended position and a retracted position relative to the housing, with the distal end thereof extending into the second frame component when the shaft is in the extended position and not extending into the second frame component when the shaft is in the retracted position, a head being slender and elongated, joined to the proximal end of the shaft, and extending radially outwardly therefrom, radially outwardly through the housing, when the shaft is in the extended position and the retracted position, and a spring joined between the head and the housing and biasing the shaft into the extended position.

16 Claims, 14 Drawing Sheets

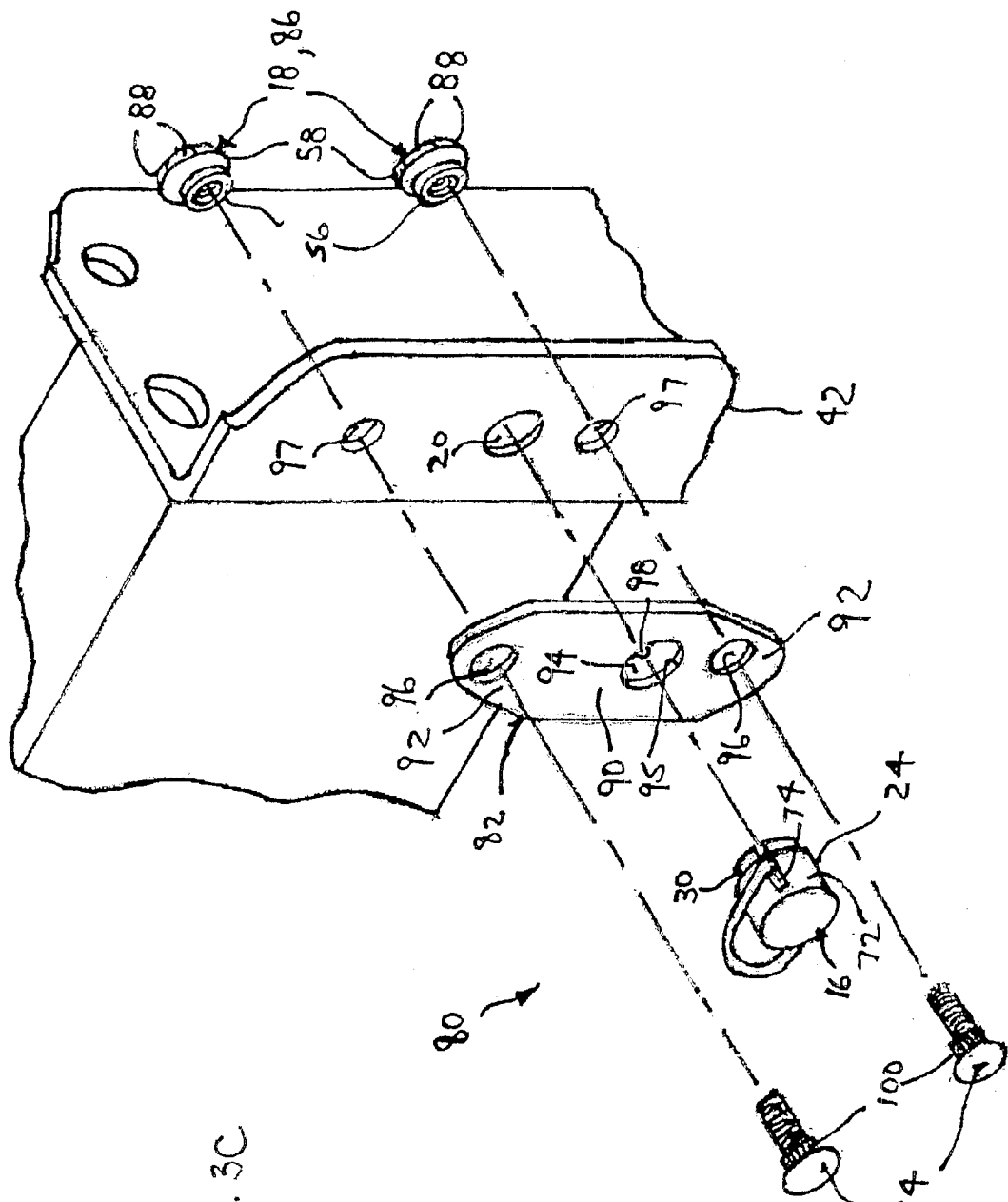

LOCK FOR PREVENTING INADVERTENT REMOVAL OF A FIRST FRAME COMPONENT OF AN ADJUSTABLE STORAGE SYSTEM FROM A SECOND FRAME COMPONENT OF THE ADJUSTABLE STORAGE SYSTEM AND THE ADJUSTABLE STORAGE SYSTEM

BACKGROUND OF THE INVENTION

1. Field of the Invention

The present invention relates to a lock for an adjustable storage system. More particularly, the present invention relates to a lock for preventing inadvertent removal of a first frame component of an adjustable storage system from a second frame component of the adjustable storage system and the adjustable storage system.

2. Description of the Prior Art

In a conventional modular frame system there are vertical support members or columns that interconnect with horizontal support members or beams. The columns have vertically extending rows of slots and the beams have spaced apart pins that insert into slots in the upright columns.

The beam is connected to the column by first inserting the pins into upper portions of the slots and then sliding the pins downward into lower portions of the slots. When the beam is so connected, a portion of the pin projects beyond the slot to secure the beam from axially disengaging from the upright column, i.e., the beam can only be disconnected by reversing the connection sequence.

Once the beam is connected to the column by inserting the pins in the upper portions of the slots and sliding them into the lower portions of the slots, the beam will remain secured to the column so long as there is a downward force on the pins. There are situations, however, where the beam can accidentally become disengaged from the column. For instance, if a person or machine exerts a lifting force on the beam greater than the load on the beam, the pins will slide upward and the beam can accidentally disengage from the column. During unexpected motion of the modular frame system caused by an object striking the frame or the frame being subjected to vibrational loads, it is possible that the beam will move vertically relative to the column and become disengaged.

To prevent inadvertent disengagement of the beam from the column, it is therefore desirable to lock the beam in place once the pins have been installed into the lower portions of the slots. Thus, there exists a need for a lock that facilitates releasably locking the pins against vertical movement after they have been installed into the lower portions of the slots, which is automatic, i.e., connection of the beam to the column by installation of the pins into the lower openings of the slots automatically actuates the lock, which requires no tools to disengage the lock, and which is readily adaptable for use with conventional modular frame components.

Innovations for adjustable storage systems have been provided in the prior art. Even though these innovations may be suitable for the specific individual purposes to which they address, however, they differ from the present invention.

FOR EXAMPLE, U.S. Pat. Nos. 5,938,367 and 6,203,234 to Olson teach an automatic lock mechanism for locking adjustable frame system components together. The locking mechanism includes a locking pin having a shaft, a head, and a biasing spring that cooperates with a stud and slot locking mechanism. A stud is inserted into a slot, for example, a teardrop shaped slot, and then moved downward to the direction of insertion. The locking pin then extends into the slot preventing inadvertent upward movement of a horizontal member.

It is apparent that innovations for adjustable storage systems have been provided in the prior art that are adapted to be used. Even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a lock for preventing inadvertent removal of a first frame component of an adjustable storage system from a second frame component of the adjustable storage system and the adjustable storage system that avoids the disadvantages of the prior art.

ANOTHER OBJECT of the present invention is to provide a lock for preventing inadvertent removal of a first frame component of an adjustable storage system from a second frame component of the adjustable storage system and the adjustable storage system that is simple to use.

BRIEFLY STATED, STILL ANOTHER OBJECT of the present invention is to provide a lock for preventing inadvertent removal of a first frame component from a second frame component of an adjustable storage system. The lock includes a housing having a distal end extending into the first frame component, a shaft having a proximal end and a distal end and movable between an extended position and a retracted position relative to the housing, with the distal end thereof extending into the second frame component when the shaft is in the extended position and not extending into the second frame component when the shaft is in the retracted position, a head being slender and elongated, joined to the proximal end of the shaft, and extending radially outwardly therefrom, radially outwardly through the housing, when the shaft is in the extended position and the retracted position, and a spring joined between the head and the housing and biasing the shaft into the extended position.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 3C is an exploded diagrammatic perspective view of an alternate embodiment of the end connector shown in FIG. 2;

Figure 1:
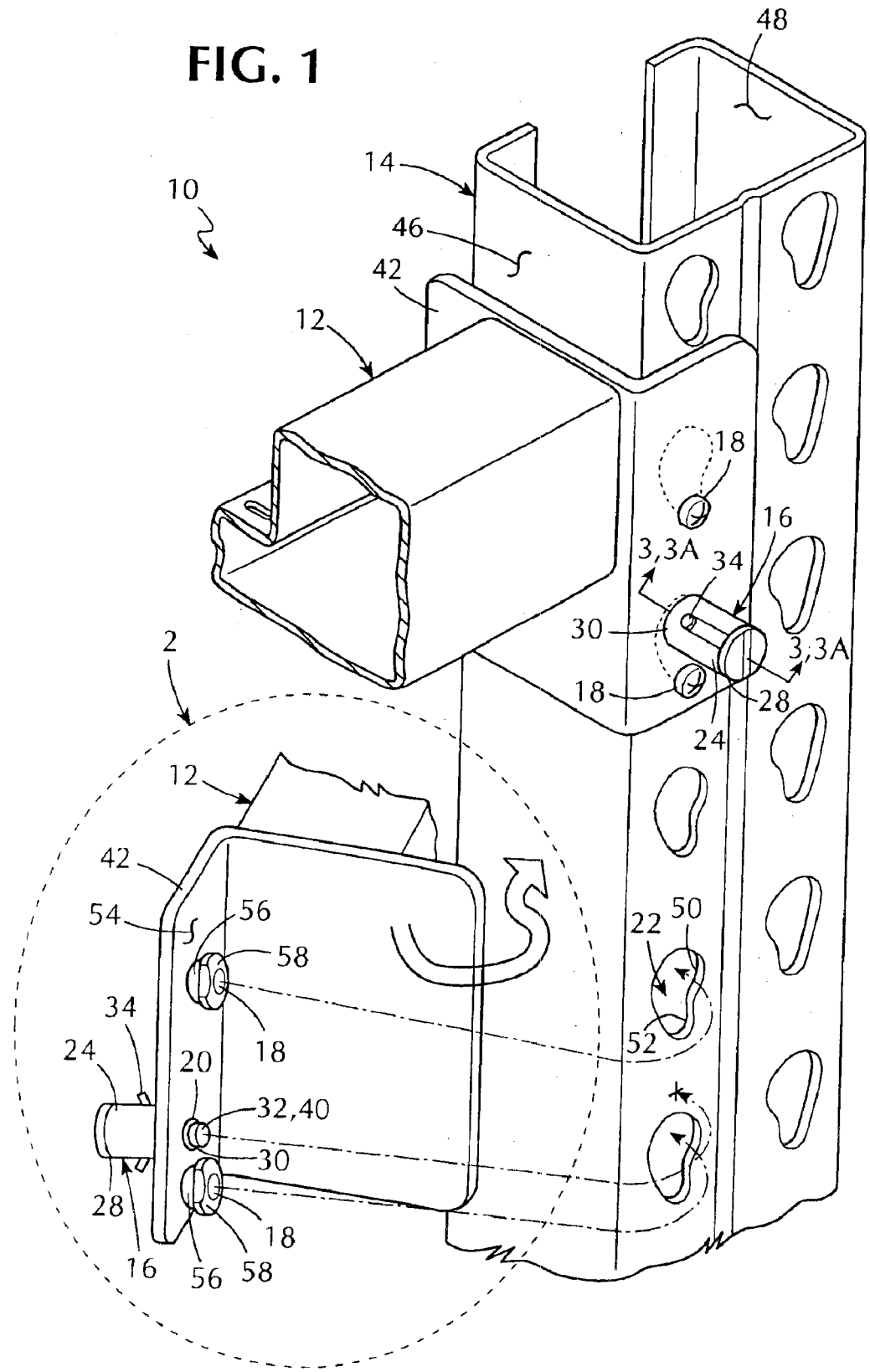
FIG. 1 is a diagrammatic perspective view of the adjustable storage system of the present invention.

LIST OF REFERENCE NUMERALS UTILIZED IN THE DRAWING 10 adjustable storage system of present invention
12 first frame component
14 second frame component
16 lock
18 at least one stud of first frame component 12
20 throughbore in first frame component 12
22 at least one throughslot in second frame component 14
24 housing of lock 16
26 locking pin of lock 16
28 proximal end of housing 24 of lock 16
30 distal end of housing 24 of lock 16
32 shaft of locking pin 26 of lock 16
34 head of locking pin 26 of lock 16
38 spring of locking pin 26 of lock 16
40 proximal end of shaft 32 of locking pin 26 of lock 16
42 distal end of shaft 32 of locking pin 26 of lock 16
42 end connector of first frame component 12
44 edge defining throughbore 20 in first frame component 12
46 outer surface of second frame component 14
48 inner surface of second frame component 14
50 upper portion of at least one throughslot 22 in second frame component 14
52 lower portion of at least one throughslot 22 in second frame component 14
54 outer surface of end connector 42 of first frame component 12
56 shaft of at least one stud 18 of first frame component 12
58 head of at least one stud 18 of first frame component 12
64 inner surface of housing 24 of lock 16
66 cavity contained in housing 24 of lock 16
68 cap of housing 24 of lock 16
70 at least one slot in cap 68 of housing 24 of lock 16 facilitating threading and unthreading cap 68 of housing 24 of lock 16
72 longitudinal wall of housing 24 of lock 16
74 pair of throughslots in housing 24 of lock 16
75 tab extending radially inwardly from edge 44 defining throughbore 20 in end connector 42 of first frame connector 12
76 proximal end of spring 36 of locking pin 26
77 arcuate-shaped member of locking pin 26
78 distal end of spring 36 of locking pin 26
79 D-ring of locking pin 26
80 plate assembly
82 plate of plate assembly 80
84 pair of bolts of plate assembly 80
86 one-piece specifically-shaped nut of each stud of at least one stud 18
88 opposing flats of head 58 of each stud of at least one stud 18 for engagement by tool to facilitate threading
90 main portion of plate 82 of plate assembly 80
92 pair of end portions of plate 82 of plate assembly 80
94 primary through bore in main portion 90 of plate 82 of plate assembly 80
95 edge defining primary through bore 94 in main portion 90 of plate 82 of plate assembly 80
96 pair of secondary through bores 96 in pair of end portions 92 of plate 82 of plate assembly 80, respectively
97 pair of through bores in end connector 42 from which each stud of at least one stud 18 extends, respectively
98 tab extending radially inwardly from edge 95 defining primary through bore 94 in plate 82 of plate assembly 80
100 spline portions of pair of bolts 84 of plate assembly 80, respectively

DETAILED DESCRIPTION OF THE PREFERRED EMBODIMENT

Figure 2:
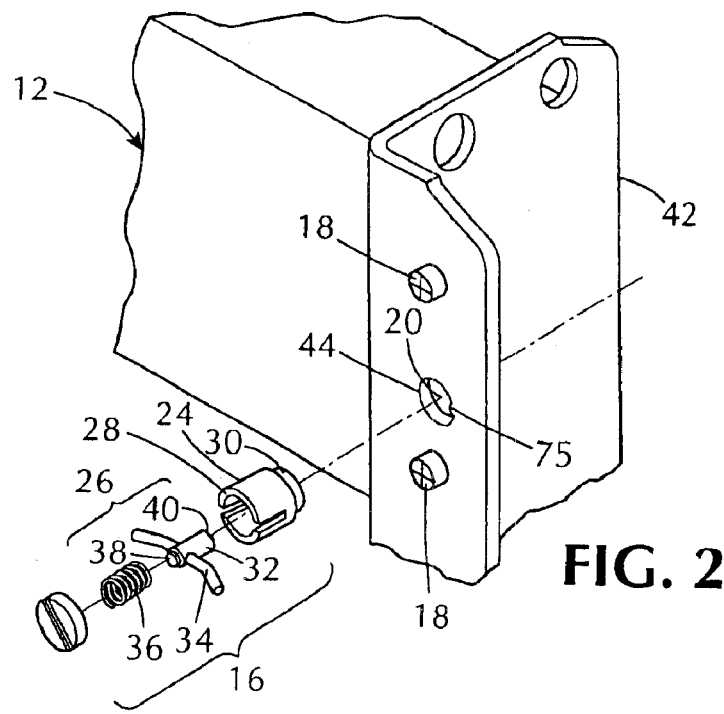
FIG. 2 is an exploded diagrammatic perspective view of the area generally enclosed by the dotted curve identified by ARROW 2 in FIG. 1 of the lock and the end connector of the adjustable storage system of the present invention shown in FIG. 1.

Referring now to the figures, in which like numerals indicate like parts, and particularly to FIGS. 1 and 2, which are, respectively, a diagrammatic perspective view of the adjustable storage system of the present invention, and an exploded diagrammatic perspective view of the area generally enclosed by the dotted curve identified by ARROW 2 in FIG. 1 of the lock and the end connector of the adjustable storage system of the present invention shown in FIG. 1, the adjustable storage system of the present invention is shown generally at 10.

The adjustable storage system 10 comprises a first frame component 12, a second frame component 14, and a lock 16. The first frame component 12 has at least one stud 18 and a throughbore 20, and the second frame component 14 has at least one throughslot 22. The at least one throughslot 22 in the second frame component 14 receives the at least one stud 18 of the first frame component 12, respectively, so as to define a location where the first frame component 12 is linked to the second frame component 14. The first frame component 12 and the second frame component 14 are unlinked from each other by disengaging the at least one stud 18 of the first frame component 12 from the at least one throughslot 22 in the second frame component 14, respectively.

The first frame component 12 is a horizontal member and the second frame component 14 is a vertical member. Alternatively, the first frame component 12 is a horizontal member and the second frame component 14 is a horizontal member.

The lock 16 is attached to the first frame component 12, but is spaced-apart from the at least one stud 18 of the first frame component 12. The lock 16 has a housing 24 and a locking pin 26. The housing 24 of the lock 16 extends into the throughbore 20 in the first frame component 12, and has a proximal end 28 and a distal end 30. The locking pin 26 of the lock 16 has a shaft 32, a head 34, and a spring 36.

The shaft 32 of the locking pin 26 is positioned within the housing 24 of the lock 16, and is movable between an extended position and a retracted position. The shaft 32 of the locking pin 26 has a proximal end 38 and a distal end 40 that extends into one throughslot of the at least one throughslot 22 in the second frame component 14 when the shaft 32 of the locking pin 26 is in the extended position thereof, but does not extend into the one throughslot of the at least one throughslot 22 in the second frame component 14 when the shaft 32 of the locking pin 26 is in the retracted position thereof.

The head 34 of the locking pin 26 is joined to the proximal end 38 of the shaft 32, and extends radially through the housing 24 of the lock 16, and is never outside the proximal end 28 of the housing 24 when the shaft 32 of the locking pin 26 is in the extended position thereof and the retracted position thereof. The spring 36 of the locking pin 26 is joined between the head 34 of the locking pin 26 and the housing 24 of the lock 16, and biases the shaft 32 of the locking pin 26 into the extended position thereof so as to allow the distal end 40 of the shaft 32 to extend outside the distal end 30 of the housing 24.

The first frame component 12 further has an end connector 42. The end connector 42 of the first frame component 12 has the lock 16 attached thereto, and is affixed to the first frame component 12, but is replaceably attachable to the second frame component 14 so as to join the first frame component 12 to the second frame component 14. The end connector 42 of the first frame component 12 further has the at least one stud 18 thereon that is inserted into the at least one throughslot 22 in the second frame component 14, respectively, to attach the first frame component 12 to the second frame component 14 in a linked configuration at a desired location. The end connector 42 of the first frame component 12 further has the throughbore 20 of the first frame component 12 therein, which is defined by an edge 44 that is sized to receive the distal end 30 of the housing 24.

The second frame component 14 is tubular, and has a generally square lateral cross section, an outer surface 46, and an inner surface 48. The outer surface 46 of the second frame component 14 is spaced-apart from the inner surface 48 of the second frame component 14 by a wall thickness.

The at least one throughslot 22 in the second frame component 14 is teardrop shaped, and has an upper portion 50 with a diameter and a lower portion 52 with a diameter. The upper portion 50 of the at least one throughslot 22 is connected to the lower portion 52 of the at least one throughslot 22, respectively, with the diameter of the lower portion 52 of the at least one throughslot 22 being smaller than the diameter of the upper portion 50 of the at least one throughslot 22, respectively.

The end connector 42 of the first frame component 12 has an outer surface 54 and the at least one stud 18 has a shaft 56 with a length and a head 58. The shaft 56 of the at least one stud 18 extends from the outer surface 54 of the end connector 42, with the length of the shaft 56 of the at least one stud 18 being generally greater than the wall thickness of the second frame component 14. The head 58 of the at least one stud 18 is joined to the shaft 56 of the at least one stud 18, and has a truncated circular shape and a diameter. The diameter of the head 58 of the at least one stud 18 is smaller than the diameter of the upper portion 50 of the at least one throughslot 22 in the second frame component 14, but is larger than the diameter of the lower portion 52 of the at least one throughslot 22 in the second frame component 14 so as to allow for axial insertion of the head 58 of the at least one stud 18 into the upper portion 50 of the at least one throughslot 22 in the second frame component 14, while preventing the head 58 of the at least one stud 18 from axial disengagement from the lower portion 52 of the at least one throughslot 22 in the second frame component 14. Alternatively, the at least one stud 18 of the first frame component 12 is a flat tab and the at least one throughslot 22 in the second frame component 14 is a narrow throughslot.

The first frame component 12 and the second frame component 14 are locked together against disengagement when the at least one stud 18 of the first frame component 12 and the at least one throughslot 22 in the second frame component 14 are in the linked configuration and the shaft 32 of the locking pin 26, when in the extended position thereof, extends into a throughslot of the at least one throughslot 22 in the second frame component 14 entered by the at least one stud 18 of the first frame component 12 so as to prevent movement of the at least one stud 18 of the first frame component 12 sufficient for disengagement of the at least one stud 18 of the first frame component 12 from the at least one throughslot 22 in the second frame component 14, respectively. The first frame component 12 and the second frame component 14 are unlocked from each other by moving the shaft 32 of the locking pin 26 to the retracted position thereof so as to remove the shaft 32 of the locking pin 26 from the throughslot of the at least one throughslot 22 in the second frame component 14 so as to allow removal of the at least one stud 18 of the first frame component 12 from the at least one throughslot 22 in the second frame component 14, respectively, and disengage the first frame component 12 from the second frame component 14.

Alternatively, the first frame component 12 and the second frame component 14 are locked together against disengagement when the at least one stud 18 of the first frame component 12 and the at least one throughslot 22 in the second frame component 14 are in the linked configuration and the shaft 32 of the locking pin 26, when in the extended position thereof, extends into another throughslot of the at least one throughslot 22 in the second frame component 14 not entered by the at least one stud 18 of the first frame component 12 so as to prevent movement of the at least one stud 18 of the first frame component 12 sufficient for disengagement of the at least one stud 18 of the first frame component 12 from the at least one throughslot 22 in the second frame component 14, respectively. The first frame component 12 and the second frame component 14 are unlocked from each other by moving the shaft 32 of the locking pin 26 to the retracted position so as to remove the shaft 32 of the locking pin 26 from the another throughslot of the at least one throughslot 22 in the second frame component 14 so as to allow removal of the at least one stud 18 of the first frame component 12 from the at least one throughslot 22 in the second frame component 14, respectively, and disengage the first frame component 12 from the second frame component 14.

Further alternatively, the second frame component 14 has a throughbore that is separate from the at least one throughslot 22 in the second frame component 14. The first frame component 12 and the second frame component 14 are locked together against disengagement when the at least one stud 18 of the first frame component 12 and the at least one throughslot 22 in the second frame component 14 are in the linked configuration and the shaft 32 of the locking pin 26, when in the extended position thereof, extends into the throughbore in the second frame component 14 so as to prevent movement of the at least one stud 18 of the first frame component 12 sufficient for disengagement of the at least one stud 18 of the first frame component 12 from the at least one throughslot 22 in the second frame component 14, respectively. The first frame component 12 and the second frame component 14 are unlocked from each other by moving the shaft 32 of the locking pin 26 to the retracted position thereof so as to remove the shaft 32 of the locking pin 26 from the throughbore in the second frame component 14 so as to allow removal of the at least one stud 18 of the first frame component 12 from the at least one throughslot 22 in the second frame component 14, respectively, and disengage the first frame component 12 from the second frame component 14.

Figure 3:
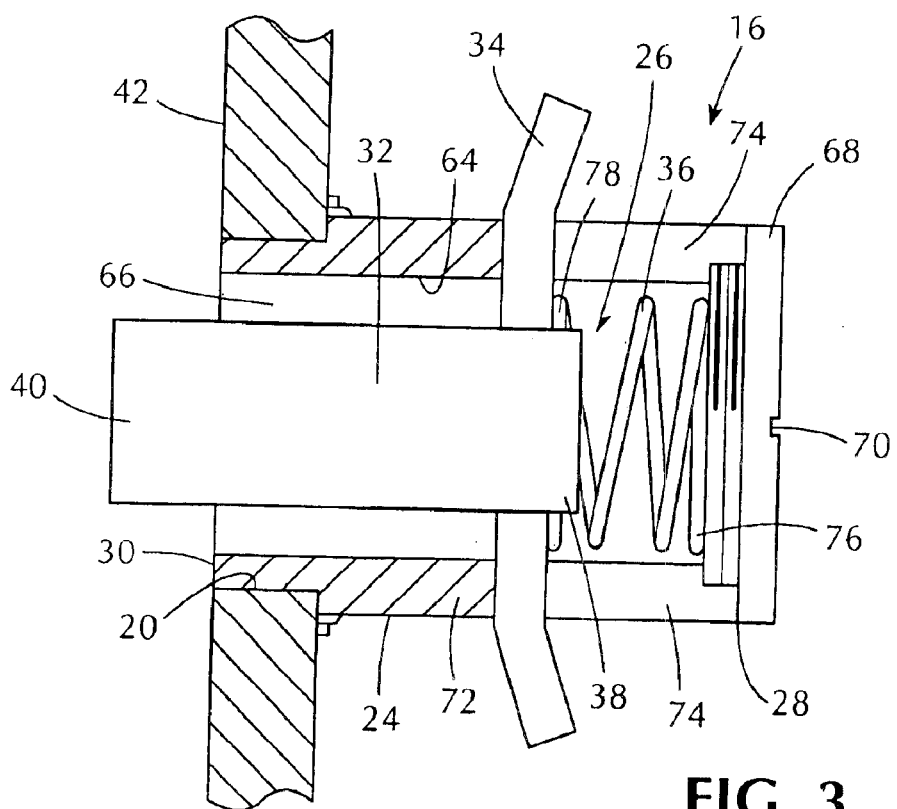
FIG. 3 is an enlarged diagrammatic cross sectional view taken on LINE 3—3 in FIG. 1 of the lock of the adjustable storage system of the present invention shown in FIG. 1.
Figures 3A, 3B:
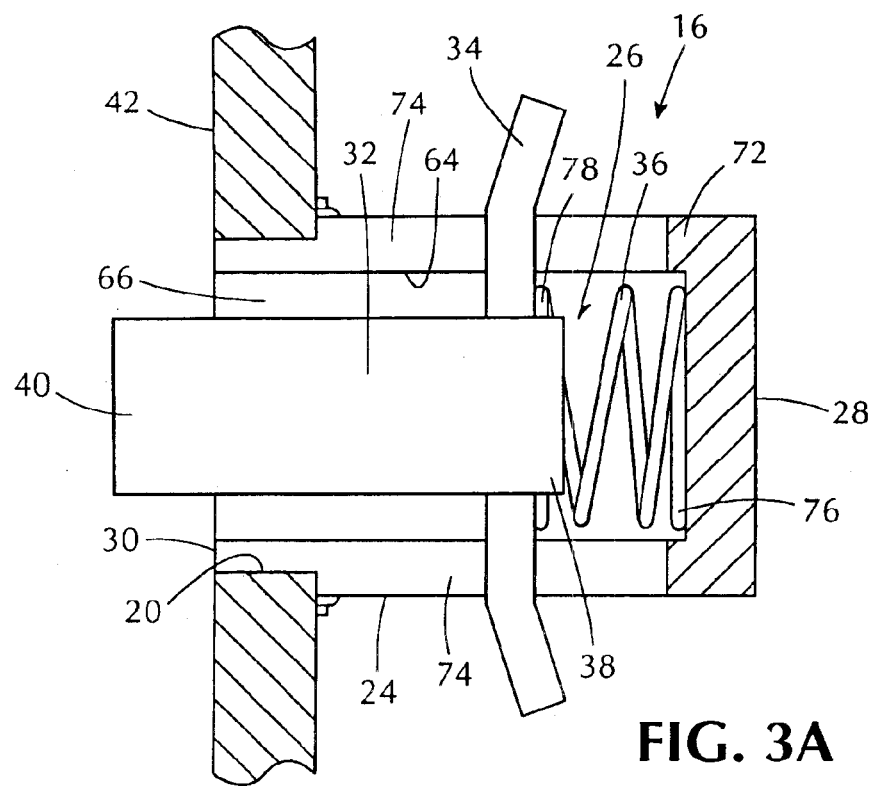
FIG. 3A is an enlarged diagrammatic cross sectional view taken on LINE 3A—3A in FIG. 1 of the lock of the adjustable storage system of the present invention shown in FIG. 1 with modified throughslots in the housing thereof.
FIG. 3B is a diagrammatic side elevational view of the lock of the adjustable storage system of the present invention shown in FIG. 3A with a modified head.
Figure 4A:
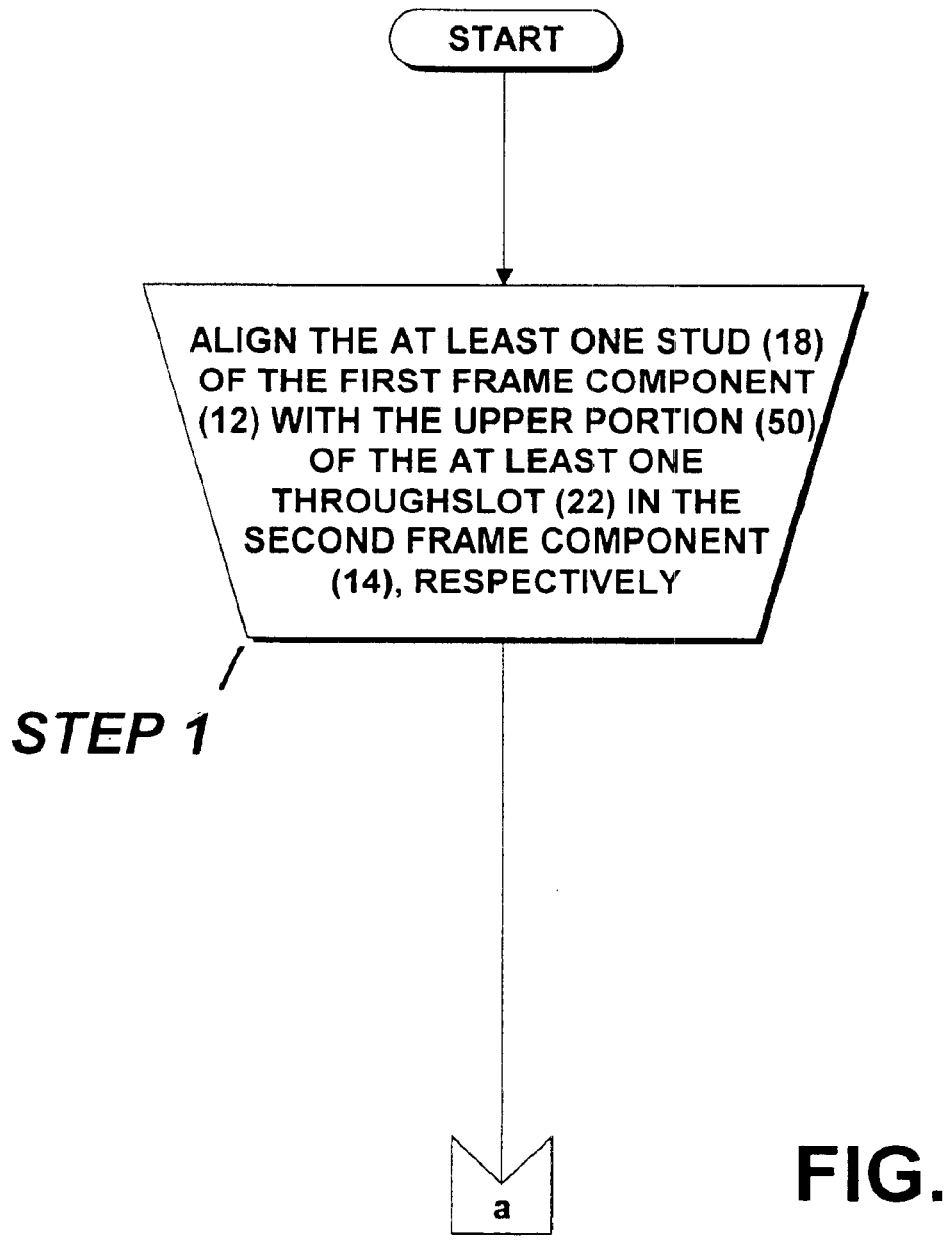
FIGS. 4A–4F are a process flow chart of the manner of linking and locking the first frame component to the second frame component of the adjustable storage system of the present invention shown in FIG. 1.
Figure 4B:
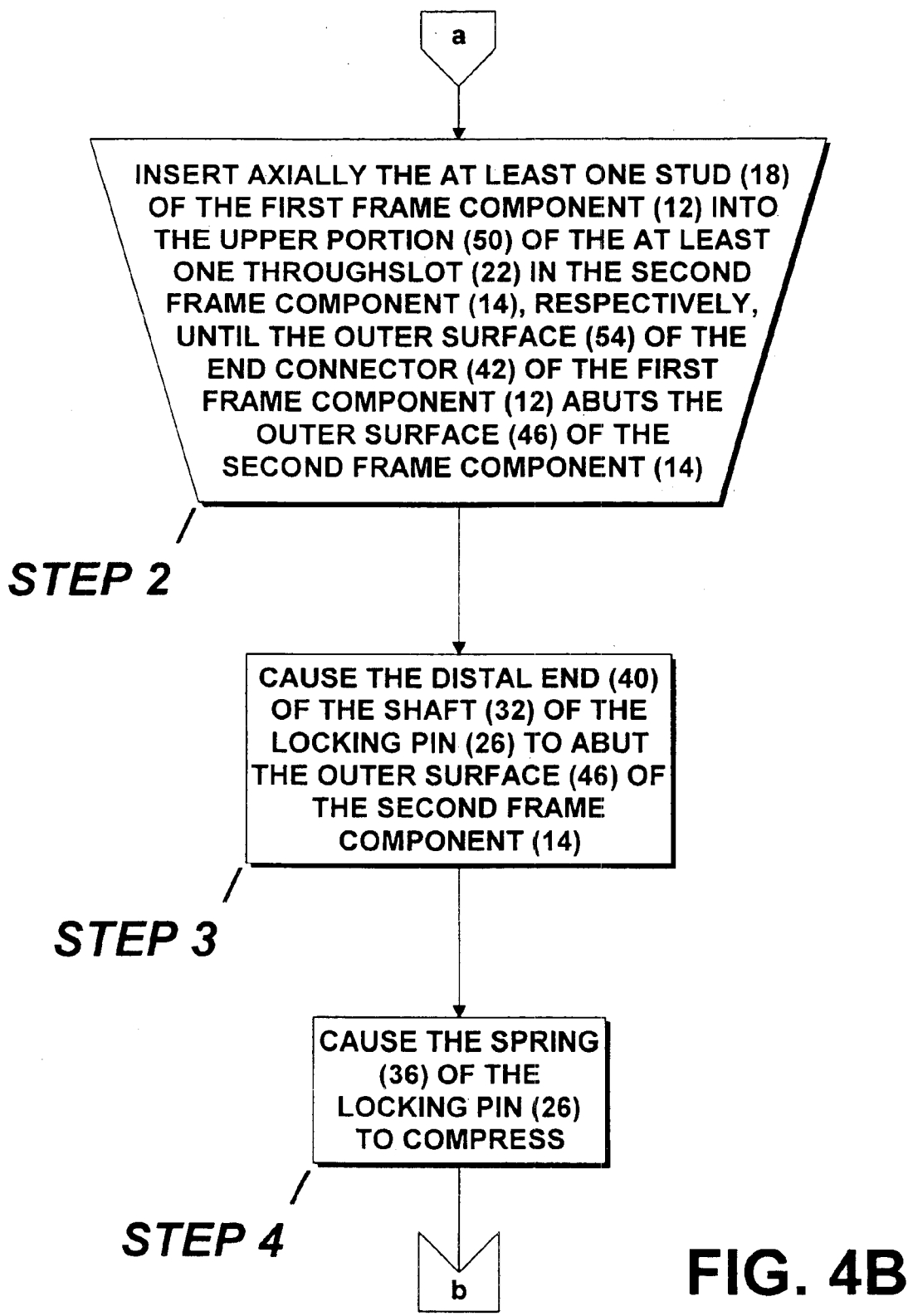
Figure 4C:
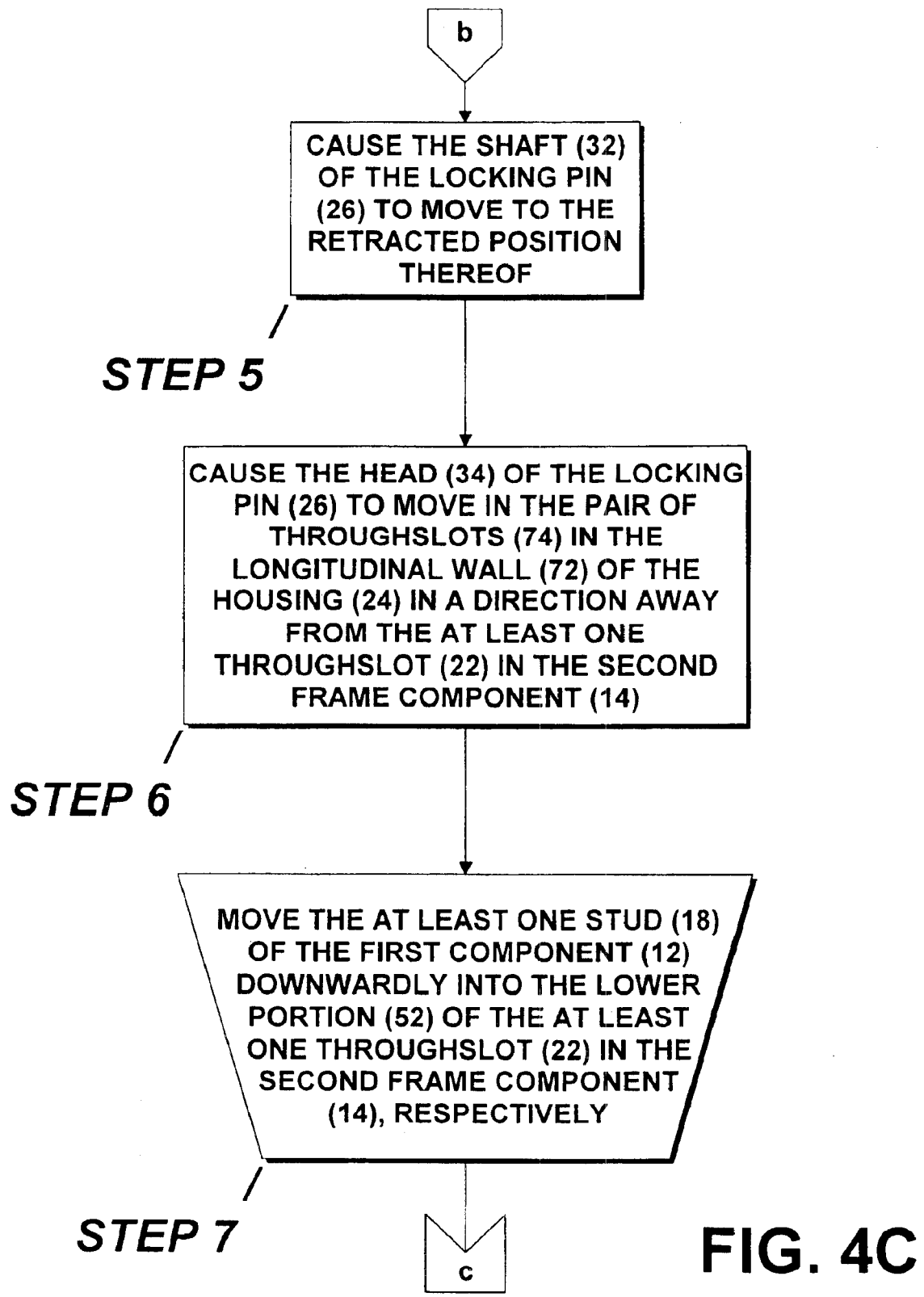
Figure 4D:
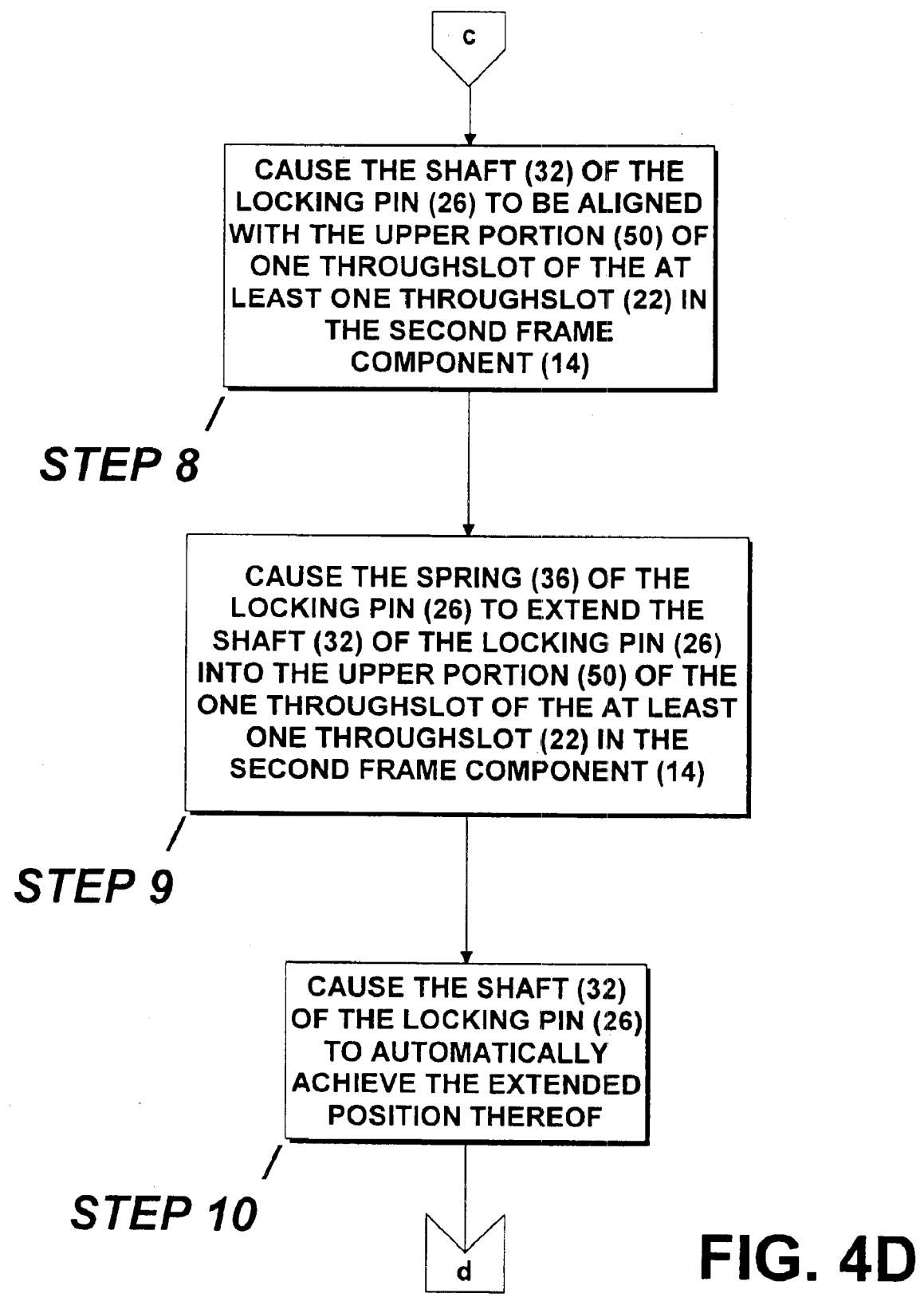
Figure 4E:
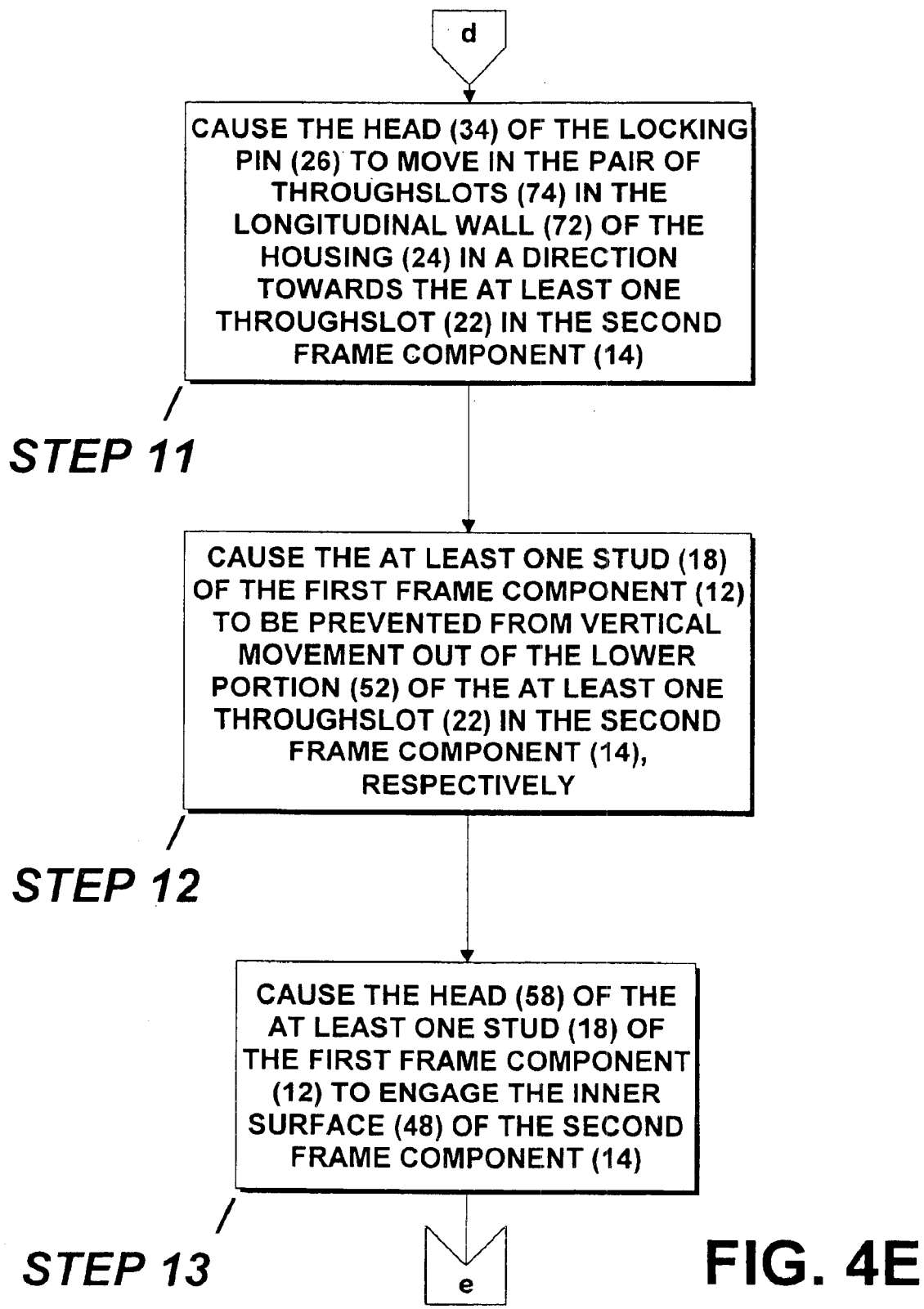
Figure 4F:
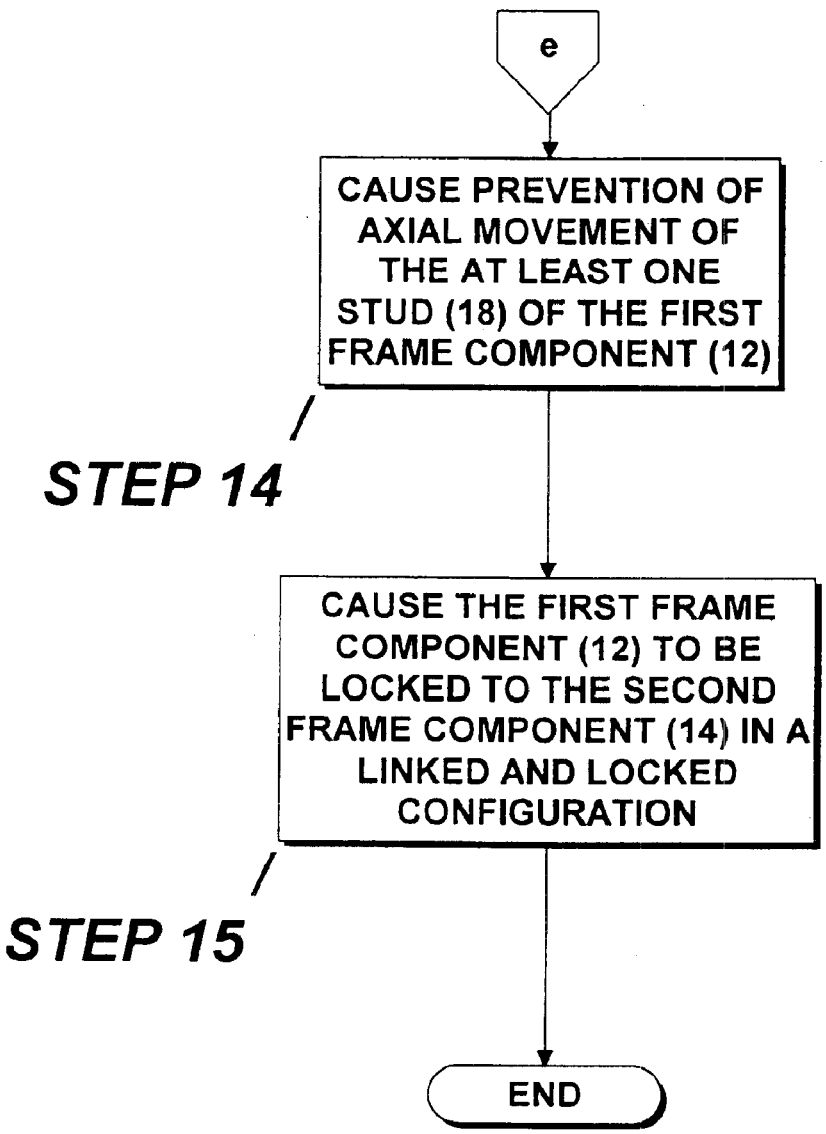
Figure 5A:
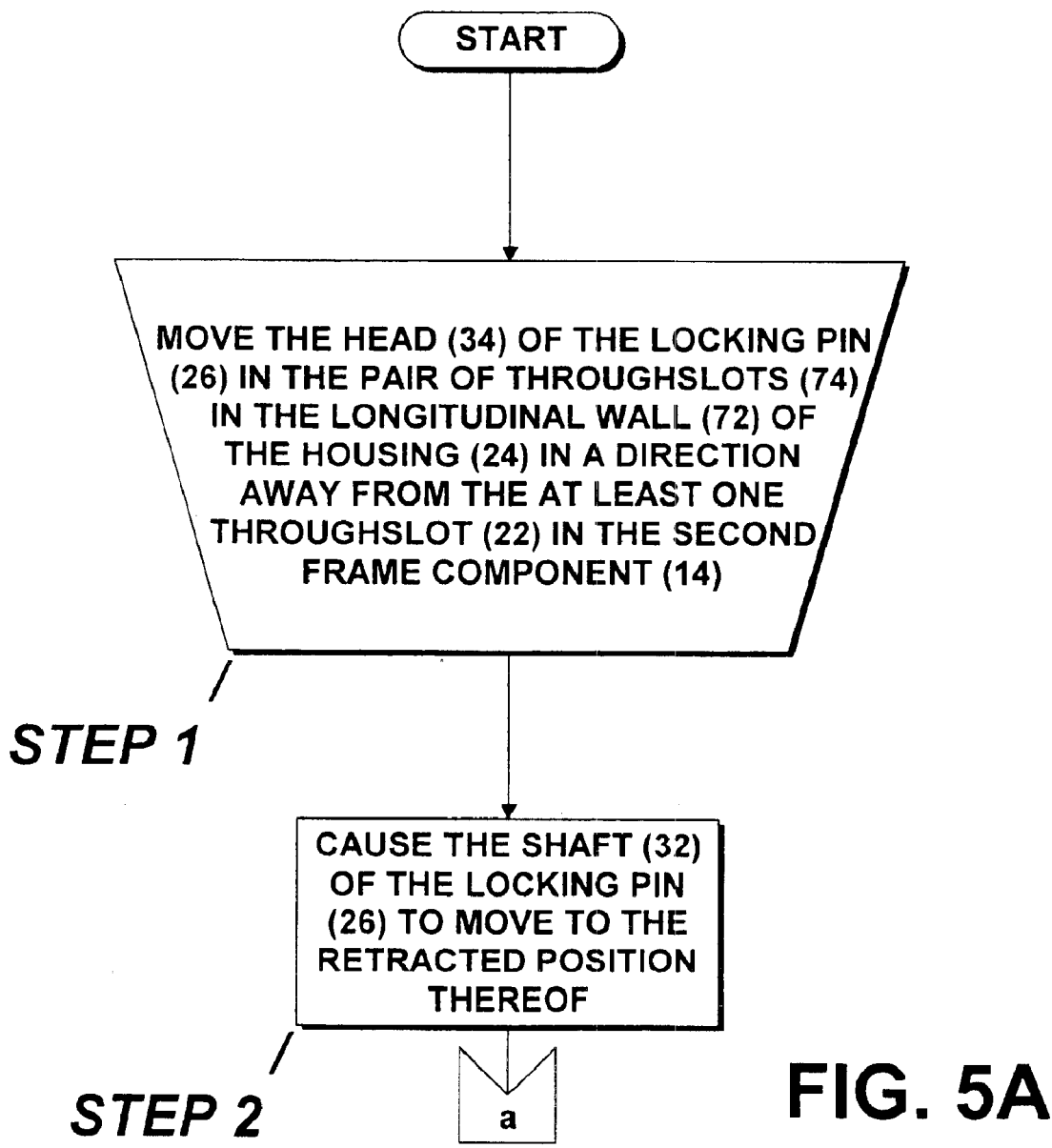
FIGS. 5A–5D are a process flow chart of the manner of unlocking and unlinking the first frame component from the second frame component of the adjustable storage system of the present invention shown in FIG. 1.
Figure 5B:
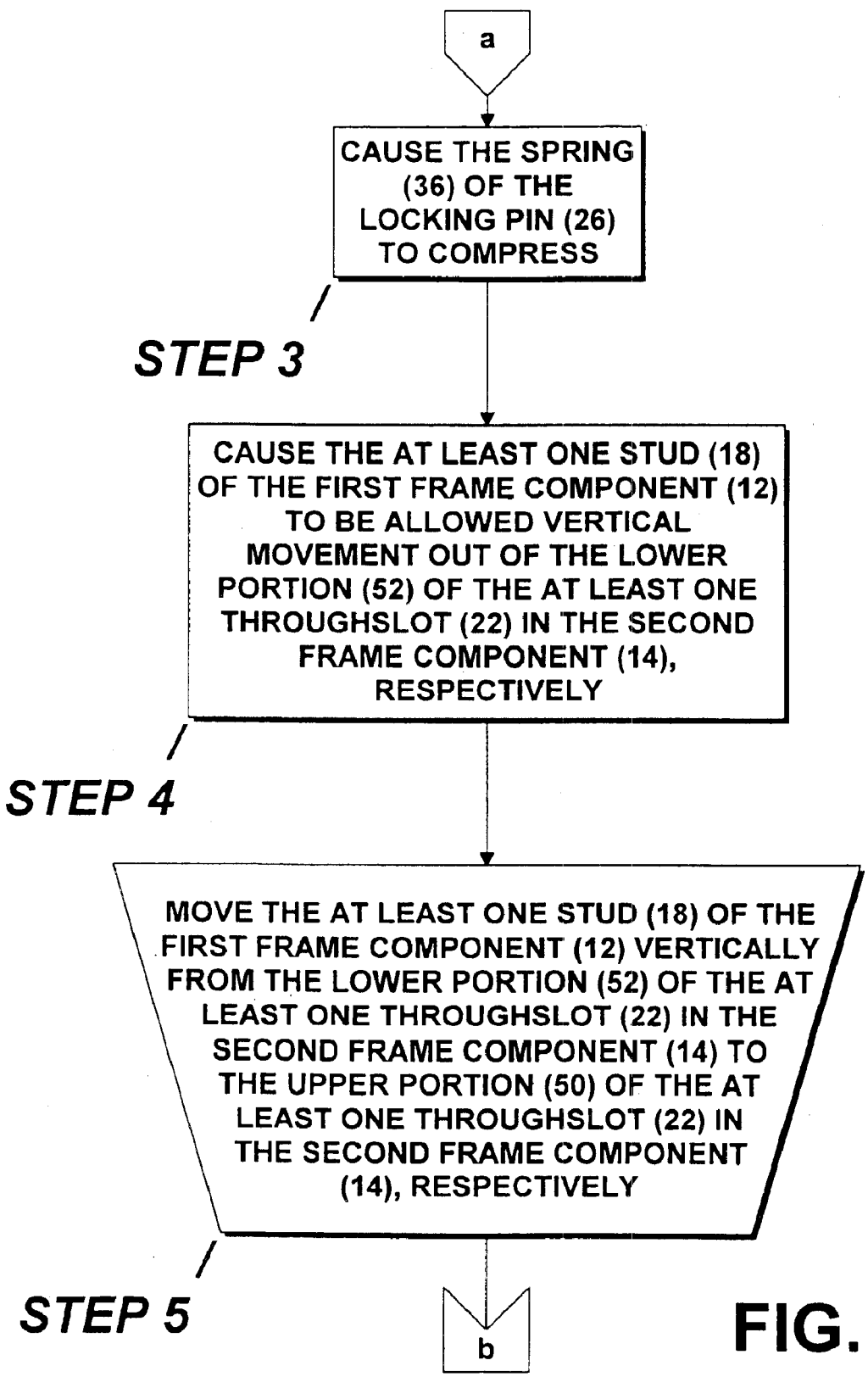
Figure 5C:
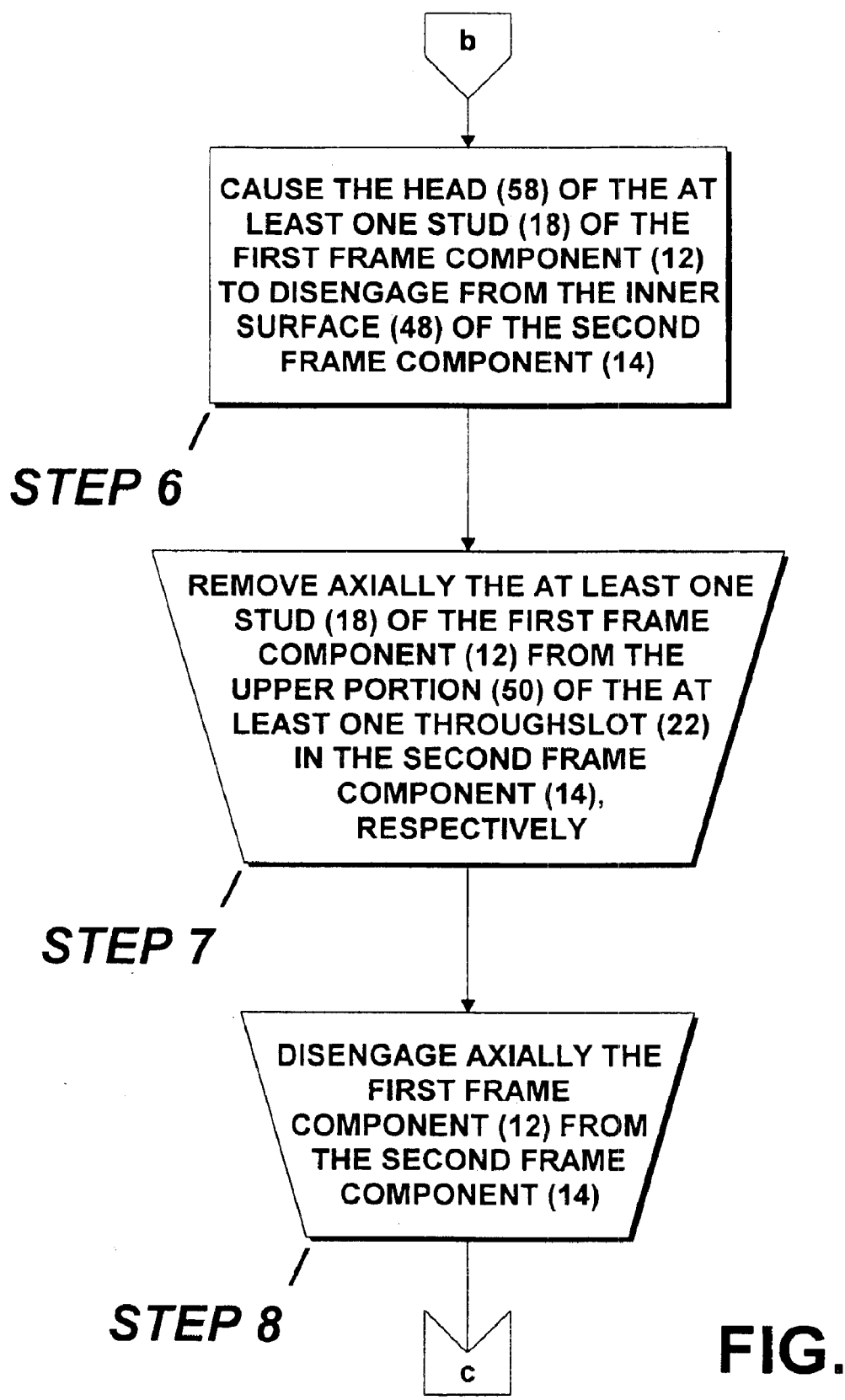
Figure 5D:
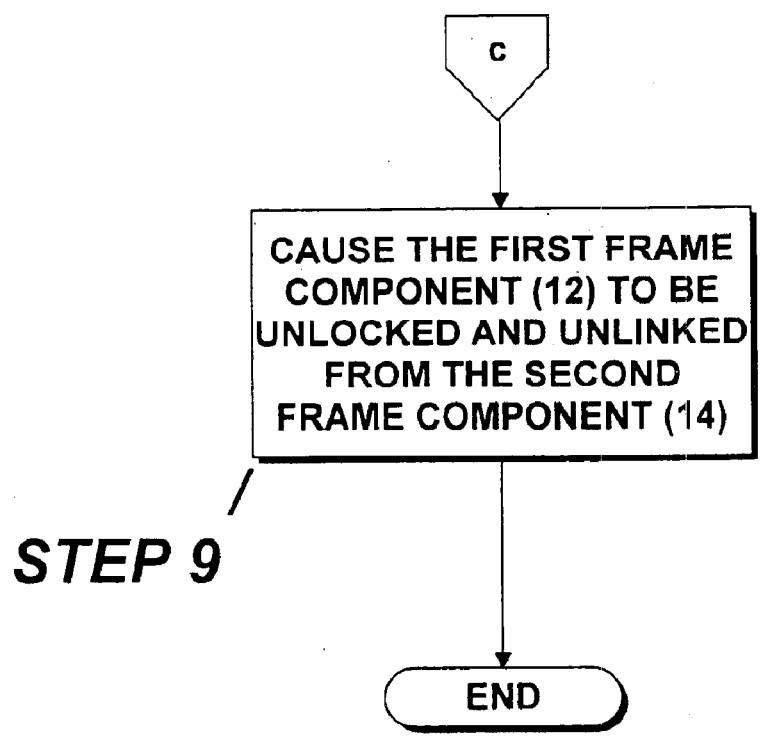

The specific configuration of the lock 16 can best be seen in FIGS. 3, 3A, and 3B, which are, respectively, an enlarged diagrammatic cross sectional view taken on LINE 3—3 in FIG. 1 of the lock of the adjustable storage system of the present invention shown in FIG. 1, an enlarged diagrammatic cross sectional view taken on line 3A—3A in FIG. 1 of the lock of the adjustable storage system of the present invention shown in FIG. 1 with modified throughslots in the housing thereof, and a diagrammatic side elevational view of the lock of the adjustable storage system of the present invention shown in FIG. 3A with a modified head, and as such, will be discussed with reference thereto.

The housing 24 of the lock 16 is cylindrical, has an inner surface 64, and contains a cavity 66 that is cylindrical and defined by the inner surface 64 of the housing 24. The cavity 66 contained in the housing 24 is between the proximal end 28 of the housing 24 and the distal end 30 of the housing 24, and opens to the throughbore 20 in the end connector 42. The proximal end 28 of the housing 24 is open and threaded and the distal end 30 of the housing 24 is open. Alternatively, as shown in FIG. 3A, the proximal end 28 of the housing 24 is closed.

The housing 24 of the lock 16 and the end connector 42 of the first frame component 12 are made of either plastic, a composite material, steel, or aluminum, and are joined together by either a weld, an adhesive, a compression fit, threads, or a press and stake.

The housing 24 further has a cap 68. The cap 68 of the housing 24 engages, and closes, the proximal end 28 of the housing 24, when the proximal end 28 of the housing 24 is open and is threaded so as to threadably engage the proximal end 28 of the housing 24, and has at least one slot 70 therein facilitating threading and unthreading the cap 68 of the housing 24.

The locking pin 26 of the lock 16 is configured to move axially in the housing 24 of the lock 16 and releasably lock the first frame component 12 and the second frame component 14 together when the at least one stud 18 of the first frame component 12 is in the linked configuration with the at least one throughslot 22 in the second frame component 14.

The shaft 32 of the locking pin 26 is cylindrical, slender, and elongated, and has a lateral cross section that is either circular, square, hexagonal, octagonal, or partially rounded.

The proximal end 38 of the shaft 32 is positioned inside the cavity 66 contained in the housing 24 when the shaft 32 of the locking pin 26 is in the extended position thereof and the retracted position thereof. The distal end 40 of the shaft 32 does not protrude from the distal end 30 of the housing 24 when the shaft 32 of the locking pin 26 is in the retracted position thereof or from the cavity 66 contained in the housing 24 when the shaft 32 of the locking pin 26 is in the retracted position thereof, but does protrude from the distal end 30 of the housing 24 when the shaft 32 of the locking pin 26 is in the extended position thereof.

The head 34 of the locking pin 26 is slender and elongated, and is joined to the proximal end 38 of the shaft 32 by either welding, threading, adhering, hot forming, or cold forming.

The housing 24 of the lock 16 further has a longitudinal wall 72 that extends from the proximal end 28 of the housing 24 to the distal end 30 of the housing 24. The head 34 of the locking pin 26 extends radially outwardly, and equidistantly, from opposing sides of the proximal end 38 of the shaft 32, and radially outwardly through the longitudinal wall 72 of the housing 24, and is gripped to move the shaft 32 of the locking pin 26 to the retracted position thereof.

The longitudinal wall 72 of the housing 24 has a pair of throughslots 74. The pair of throughslots 74 in the longitudinal wall 72 of the housing 24 are diametrically opposed to each other, and extend axially along the housing 24 of the lock 16, from, and open into, the proximal end 28 of the housing 24 to short of, and do not open into, the distal end 30 of the housing 24 when the proximal end 28 of the housing 24 is open. Alternatively, as shown in FIG. 3A, the pair of throughslots 74 in the longitudinal wall 72 of the housing 24 extend from, and open into, the distal end 30 of the housing 24 to short of, and do not open into, the proximal end 28 of the housing 24 when the proximal end 28 of the housing 24 is closed. The head 34 of the locking pin 26 extends axially movable, and radially outwardly, through the pair of throughslots 74 in the longitudinal wall 72 of the housing 24, respectively, and together with the housing 24 of the lock 16, are configured to provide a convenient mechanism for grasping the head 34 of the locking pin 26 and moving the shaft 32 of the locking pin 26 to the retracted position thereof without a need for any tools.

Alternatively, as shown in FIG. 3B, the head 34 of the locking pin 26 is pivotally joined through the proximal end 38 of the shaft 32 of the locking pin 26, and the locking pin 26 further has an arcuate-shaped member 77. The arcuate-shaped member 77 of the locking pin 26 is formed with the head 34 of the locking pin 26 so as to form a D-ring 79 therewith. The D-ring 79 of the locking pin 26 is pivotally joined through the proximal end 38 of the shaft 32 of the locking pin 26, by virtue of the head 34 of the locking pin 26 being pivotally joined through the proximal end 38 of the shaft 32 of the locking pin 26, so as to provide a convenient mechanism for grasping and moving the shaft 32 of the locking pin 26 to the retracted position thereof without a need for any tools, and when the D-ring 79 of the locking pin 26 is released, the D-ring 79 of the locking pin 26 pivots downwardly by gravity so as not to be accidently caught upon.

With the distal end 30 of the housing 24 being affixed in the throughbore 20 in the end connector 42, the pair of throughslots 74 in the longitudinal wall 72 of the housing 24 opening into the proximal end 28 of the housing 24 and not opening into the distal end 30 of the housing 24, and the head 34 of the locking pin 26 extending through the pair of throughslots 74 in the longitudinal wall 72 of the housing 24, the cap 68 of the housing 24 being replaceably attached to the proximal end 28 of the housing 24 allows servicing of the locking pin 26 if a malfunction occurs without compromising the structural integrity of the lock 16, and as a result thereof, the lock 16 and the end connector 42 of the first frame component 12 do not have to be scraped.

The throughbore 20 in the first frame component 12 is in the end connector 42 of the first frame connector 12. The edge 44 that defines the throughbore 20 in the end connector 42 has a tab 75 that extends radially inwardly therefrom. The tab 75 in the throughbore 20 in the end connector 42 engages one throughslot of the pair of throughslots 74 in the longitudinal wall 72 of the housing 24 so as to prevent rotation of the housing 24 of the lock 16 relative to the end connector 42 of the first frame connector 12. (See FIG. 2).

The spring 36 of the locking pin 26 is encased within the housing 24 of the lock 16, is positioned to lie compressingly between the head 34 of the locking pin 26 and the cap 68 of the housing 24, and has a proximal end 76 that lies, and engages, against the cap 68 of the housing 24 and a distal end 78 that lies, and engages, against the head 34 of the locking pin 26. The spring 36 of the locking pin 26 is either a metal coil spring, a flat metal spring, a plastic spring, a composite spring, or a compressible material spring.

The housing 24 of the lock 16, the shaft 32 of the locking pin 26, the locking pin 26 of the lock 16, the cavity 66 contained in the housing 24, and the spring 36 of the locking pin 26 are substantially coaxial.

An alternate embodiment of the end connector 42 can best be seen in FIG. 3C, which is an exploded diagrammatic perspective view of an alternate embodiment of the end connector shown in FIG. 2, and as such, will be discussed with reference thereto.

The lock 16 and the at least one stud 18 are replaceably attached to the end connector 42 so as to allow the end connector 42 to be coated by a coating, such as by painting, hot dip galvanizing, or the like, before the lock 16 and the at least one stud 18 are replaceably attached thereto, and to allow replacement of the lock 16 and/or the at least one stud 18 without having to scrap the end connector 42.

The lock 16 is replaceably affixed to the end connector 42 by a plate assembly 80. The plate assembly 80 comprises a plate 82 and a pair of bolts 84, and the at least one stud 18 comprises the shaft 56 and the head 58 thereof being a one-piece specifically-shaped nut 86.

The shaft 56 of the one-piece specifically-shaped nut 86 is cylindrically-shaped and the head 58 extends coaxially therefrom and has opposing flats 88 for engagement by a tool, such as a wrench, pliers, or the like to facilitate threading.

The main portion 90 of the plate 82 has a primary through bore 94 and the pair of end portions 92 of the plate 82 have a pair of secondary through bores 96, respectively. The primary through bore 94 in the plate 82 is defined by an edge 95 and is aligned with the through bore 20 in the end connector 42, and the pair of secondary through bores 96 in the plate 82 straddle the primary through bore 94 in the plate 82 and are aligned with a pair of through bores 97 in the end connector 42 from which each of the at least one stud 18 extends, respectively. The primary through bore 94 is closer to one of the pair of secondary through bores 96 than the other.

The primary through bore 94 in the plate 82 receives the distal end 30 of the housing 24 of the lock 16 and is welded therein, with the distal end 30 of the housing 24 of the locking 16 extending past the plate 82 a sufficient amount to still be received in the through bore 20 in the end connector 42 so as to function as normal by virtue of the plate 82 being thin as discussed supra.

The edge 95 that defines the primary through bore 94 in the plate 82 has a tab 98 that extends radially inwardly therefrom. The tab 98 in the primary through bore 94 in the plate 82 engages one through slot of the pair of through slots 74 in the longitudinal wall 72 of the housing 24 to prevent rotation of the housing 24 of the lock 16 relative to the plate 82.

The pair of bolts 84 are press fitted, at spline portions 100 thereof, into the pair of secondary through bores 96 in the plate 82, respectively, pass freely through the pair of through bores 97 in the end connector 42, respectively, and are threadably engaged by the one-piece specifically-shaped nuts 86, respectively, to thereby hold the lock 16 in the through bore 20 in the end connector 42 and affix the studs 18.

The manner of linking and locking the first frame component 12 to the second frame component 14 can best be seen in FIGS. 4A–4F, which are a process flow chart of the manner of linking and locking the first frame component to the second frame component of of the adjustable storage system of the present invention shown in FIG. 1, and as such, will be discussed with reference thereto.

STEP 1: Align the at least one stud 18 of the first frame component 12 with the upper portion 50 of the at least one throughslot 22 in the second frame component 14, respectively.

STEP 2: Insert axially the at least one stud 18 of the first frame component 12 into the upper portion 50 of the at least one throughslot 22 in the second frame component 14, respectively, until the outer surface 54 of the end connector 42 of the first frame component 12 abuts the outer surface 46 of the second frame component 14.

STEP 3: Cause the distal end 40 of the shaft 32 of the locking pin 26 to abut the outer surface 46 of the second frame component 14.

STEP 4: Cause the spring 36 of the locking pin 26 to compress.

STEP 5: Cause the shaft 32 of the locking pin 26 to move to the retracted position thereof.

STEP 6: Cause the head 34 of the locking pin 26 to move in the pair of throughslots 74 in the longitudinal wall 72 of the housing 24 in a direction away from the at least one throughslot 22 in the second frame component 14.

STEP 7: Move the at least one stud 18 of the first component 12 downwardly into the lower portion 52 of the at least one throughslot 22 in the second frame component 14, respectively.

STEP 8: Cause the shaft 32 of the locking pin 26 to be aligned with the upper portion 50 of one throughslot of the at least one throughslot 22 in the second frame component 14.

STEP 9: Cause the spring 36 of the locking pin 26 to extend the shaft 32 of the locking pin 26 into the upper portion 50 of the one throughslot of the at least one throughslot 22 in the second frame component 14.

STEP 10: Cause the shaft 32 of the locking pin 26 to automatically achieve the extended position thereof.

STEP 11: Cause the head 34 of the locking pin 26 to move in the pair of throughslots 74 in the longitudinal wall 72 of the housing 24 of the lock 16 in a direction towards the at least one throughslot 22 in the second frame component 14.

STEP 12: Cause the at least one stud 18 of the first frame component 12 to be prevented from vertical movement out of the lower portion 52 of the at least one throughslot 22 in the second frame component 14, respectively.

STEP 13: Cause the head 58 of the at least one stud 18 of the first frame component 12 to engage the inner surface 48 of the second frame component 14.

STEP 14: Cause the prevention of axial movement of the at least one stud 18 of the first frame component 12.

STEP 15: Cause the first frame component 12 to be locked to the second frame component 14 in a linked and locked configuration.

The manner of unlocking and unlinking the first frame component 12 from the second frame component 14 can best be seen in FIGS. 5A–5D, which are a process flow chart of the manner of unlocking and unlinking the first frame component from the second frame component of the adjustable storage system of the present invention shown in FIG. 1, and as such, will be discussed with reference thereto.

STEP 1: Move the head 34 of the locking pin 26 in the pair of throughslots 74 in the longitudinal wall 72 of the housing 24 of the lock 16 in a direction away from the at least one throughslot 22 in the second frame component 14.

STEP 2: Cause the shaft 32 of the locking pin 26 to move to the retracted position thereof.

STEP 3: Cause the spring 36 of the locking pin 26 to compress.

STEP 4: Cause the at least one stud 18 of the first frame component 12 to be allowed vertical movement out of the lower portion 52 of the at least one throughslot 22 in the second frame component 14, respectively.

STEP 5: Move the at least one stud 18 of the first frame component 12 vertically from the lower portion 52 of the at least one throughslot 22 in the second frame component 14 to the upper portion 50 of the at least one throughslot 22 in the second frame component 14, respectively.

STEP 6: Cause the head 58 of the at least one stud 18 of the first frame component 12 to disengage from the inner surface 48 of the second frame component 14.

STEP 7: Remove axially the at least one stud 18 of the first frame component 12 from the upper portion 50 of the at least one throughslot 22 in the second frame component 14, respectively.

STEP 8: Disengage axially the first frame component 12 from the second frame component 14.

STEP 9: Cause the first frame component 12 to be unlocked and unlinked from the second frame component 14.

It will be understood that each of the elements described above, or two or more together, may also find a useful application in other types of constructions differing from the types described above.

While the invention has been illustrated and described as embodied in a lock for preventing inadvertent removal of a first frame component of an adjustable storage system from a second frame component of the adjustable storage system and the adjustable storage system, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An adjustable storage system, comprising:
   a) a first frame component;
   b) a second frame component; and
   c) a lock;
   wherein said first frame component has at least one stud;
   wherein said first frame component has a throughbore;
   wherein said second frame component has at least one throughslot;
   wherein said at least one throughslot in said second frame component is receivable of said at least one stud of said first frame component, respectively, so as to define a location where said first frame component is linked to said second frame component;
   wherein said first frame component and said second frame component are unlinked from each other by disengaging said at least one stud of said first frame component from said at least one throughslot in said second frame component, respectively;
   wherein said lock is attached to said first frame component;
   wherein said lock has a housing;
   wherein said housing of said lock has a proximal end;
   wherein said housing of said lock has a distal end;
   wherein said distal end of said housing extends into said throughbore in said first frame component;
   wherein said lock has a locking pin;
   wherein said locking pin of said lock has a shaft;
   wherein said shaft of said locking pin is positioned within said housing;
   wherein said shaft of said locking pin is movable between an extended position and a retracted position;
   wherein said shaft of said locking pin has a proximal end;
   wherein said shaft of said locking pin has a distal end;
   wherein said distal end of said shaft extends into said second frame component when said shaft of said locking pin is in said extended position thereof;
   wherein said distal end of said shaft does not extend into said second frame component when said shaft of said locking pin is in said retracted position thereof;
   wherein said locking pin has a head;
   wherein said head of said locking pin is joined to said proximal end of said shaft of said locking pin;
   wherein said head of said locking pin extends radially through said housing, and is never outside said proximal end of said housing when said shaft of said locking pin is in said extended position thereof and said retracted position thereof;
   wherein said locking pin has a spring;
   wherein said spring of said locking pin is joined between said head of said locking pin and said housing of said lock;
   wherein said spring of said locking pin biases said shaft of said locking pin into said extended position thereof so as to allow said distal end of said shaft to extend outside said distal end of said housing;
   wherein said first frame component has an end connector;
   wherein said end connector of said first frame component is affixed to said first frame component;
   wherein said lock is attached to said end connector of said first frame component;
   wherein said lock is spaced-apart from said at least one stud of said first frame component;
   wherein said end connector of said first frame component is replaceably attachable to said second frame component so as to join said first frame component to said second frame component;
   wherein said end connector of said first frame component has said at least one stud thereon that is inserted into said at least one throughslot in said second frame component, respectively, to attach said first frame component to said second frame component in a linked configuration at a desired location;
   wherein said end connector of said first frame component has said throughbore therein;
   wherein said throughbore in said end connector is defined by an edge;
   wherein said edge defining said throughbore in said end connector is sized to receive said distal end of said housing; and
   wherein said lock and said at least one stud are replaceably attached to said end connector so as to allow said end connector to be coated by a coating, before said lock and the at least one stud are replaceably attached thereto, and to allow replacement of at least one of said lock and said at least one stud without having to scrap said end connector.

2. The system as defined in claim 1, wherein said at least one throughslot in said second frame component is teardrop shaped;
   wherein said at least one throughslot in said second frame component has an upper portion;

wherein said upper portion of said at least one throughslot in said second frame component has a diameter;

wherein said at least one throughslot in said second frame component has a lower portion;

wherein said lower portion of said at least one throughslot in said second frame component has a diameter;

wherein said upper portion of said at least one throughslot in said second frame component is connected to said lower portion of said at least one throughslot in said second frame component, respectively; and wherein said diameter of said lower portion of said at least one throughslot in said second frame component is smaller than said diameter of said upper portion of said at least one throughslot in said second frame component, respectively.

3. The system as defined in claim 2, wherein said end connector of said first frame component has an outer surface;

wherein said at least one stud of said first frame component has a shaft;

wherein said shaft of said at least one stud extends from said outer surface of said end connector;

wherein said shaft of said at least one stud has a length;

wherein said length of said shaft of said at least one stud is generally greater than said wall thickness of said second frame component;

wherein said at least one stud has a head;

wherein said head of said at least one stud is joined to said shaft of said at least one stud;

wherein said head of said at least one stud has a diameter; and wherein said diameter of said head of said at least one stud is smaller than said diameter of said upper portion of said at least one throughslot in said second frame component, but is larger than said diameter of said lower portion of said at least one throughslot in said second frame component so as to allow for axial insertion of said head of said at least one stud into said upper portion of said at least one throughslot in said second frame component, while preventing said head of said at least one stud from axial disengagement from said lower portion of said at least one throughslot in said second frame component.

4. The system as defined in claim 3, wherein said housing has a cap;

wherein said cap of said housing engages said proximal end of said housing; and wherein said cap of said housing closes said proximal end of said housing.

5. The system as defined in claim 4, wherein said housing of said lock has a longitudinal wall;

wherein said longitudinal wall of said housing extends from said proximal end of said housing to said distal end of said housing; and wherein said head of said locking pin extends radially outwardly through said longitudinal wall of said housing.

6. The system as defined in claim 5, wherein said housing of said lock has a pair of throughslots;

wherein said pair of throughslots extend axially along said longitudinal wall of said housing;

wherein said pair of throughslots in said longitudinal wall of said housing extend from said proximal end of said housing to short of said distal end of said housing;

wherein said pair of throughslots in said longitudinal wall of said housing open into said proximal end of said housing; and wherein said pair of throughslots in said longitudinal wall of said housing do not open into said distal end of said housing.

7. The system as defined in claim 6, wherein said lock is replaceably affixed to said end connector by a plate assembly;

wherein said plate assembly comprises a plate;

wherein said plate assembly comprises a pair of bolts; and wherein said at least one stud comprises said shaft and said head thereof being a one-piece specifically-shaped nut.

8. The system as defined in claim 7, wherein said shaft of said one-piece specifically-shaped nut is cylindrically-shaped;

wherein said head of said one-piece specifically-shaped nut extends coaxially from said shaft thereof;

wherein said head of said one-piece specifically-shaped nut has opposing flats; and wherein said opposing flats on said head of said one-piece specifically-shaped nut are for engagement by a tool to facilitate threading.

9. The system as defined in claim 7, wherein said plate is thin so as not to significantly impinge upon the length of said distal end of said housing of said lock;

wherein said plate is flat so as to lie flat against said end connector;

wherein said plate has a main portion;

wherein said plate has a pair of end portions;

wherein said pair of end portions of said plate extend coplanarly from opposite ends of said main portion of said plate, respectively; and wherein said pair of end portions of said plate extend taperly from said opposite ends of said main portion of said plate, respectively, so as to avoid sharp corners.

10. The system as defined in claim 9, wherein said main portion of said plate has a primary through bore;

wherein said pair of end portions of said plate have a pair of secondary through bores, respectively;

wherein said primary through bore in said plate is defined by an edge;

wherein said primary through bore in said plate is aligned with said through bore in said end connector;

wherein said pair of secondary through bores in said plate straddle said primary through bore in said plate; and wherein said pair of secondary through bores in said plate are aligned with a pair of through bores in said end connector from which each of said at least one stud extends, respectively.

11. The system as defined in claim 10, wherein said primary through bore is closer to one of said pair of secondary through bores than the other.

12. The system as defined in claim 10, wherein said primary through bore in said plate receives said distal end of said housing of said lock, with said distal end of said housing of said locking extending past said plate a sufficient amount to still be received in said through bore in said end connector so as to function as normal by virtue of said plate being thin.

13. The system as defined in claim 10, wherein said distal end of said housing of said lock is welded in said primary through bore in said plate.

14. The system as defined in claim 10, wherein said edge that defines said primary through bore in said plate has a tab;

wherein said tab extends radially inwardly from said edge that defines said primary through bore in said plate; and wherein said tab in said primary through bore in said plate engages one through slot of said pair of through slots in said longitudinal wall of said housing to prevent rotation of said housing of said lock relative to said plate.

15. The system as defined in claim 10, wherein said pair of bolts are press fitted, at spline portions thereof, into said pair of secondary through bores in said plate, respectively, pass freely through said pair of through bores in said end connector, respectively, and are threadably engaged by said one-piece specifically-shaped nuts, respectively, to thereby hold said lock in said through bore in said end connector and affix said studs.

16. The system as defined in claim 1, wherein said coating is selected from the group consisting of painting and hot dip galvanizing.

* * * * *